United States Patent Office 3,545,915
Patented Dec. 8, 1970

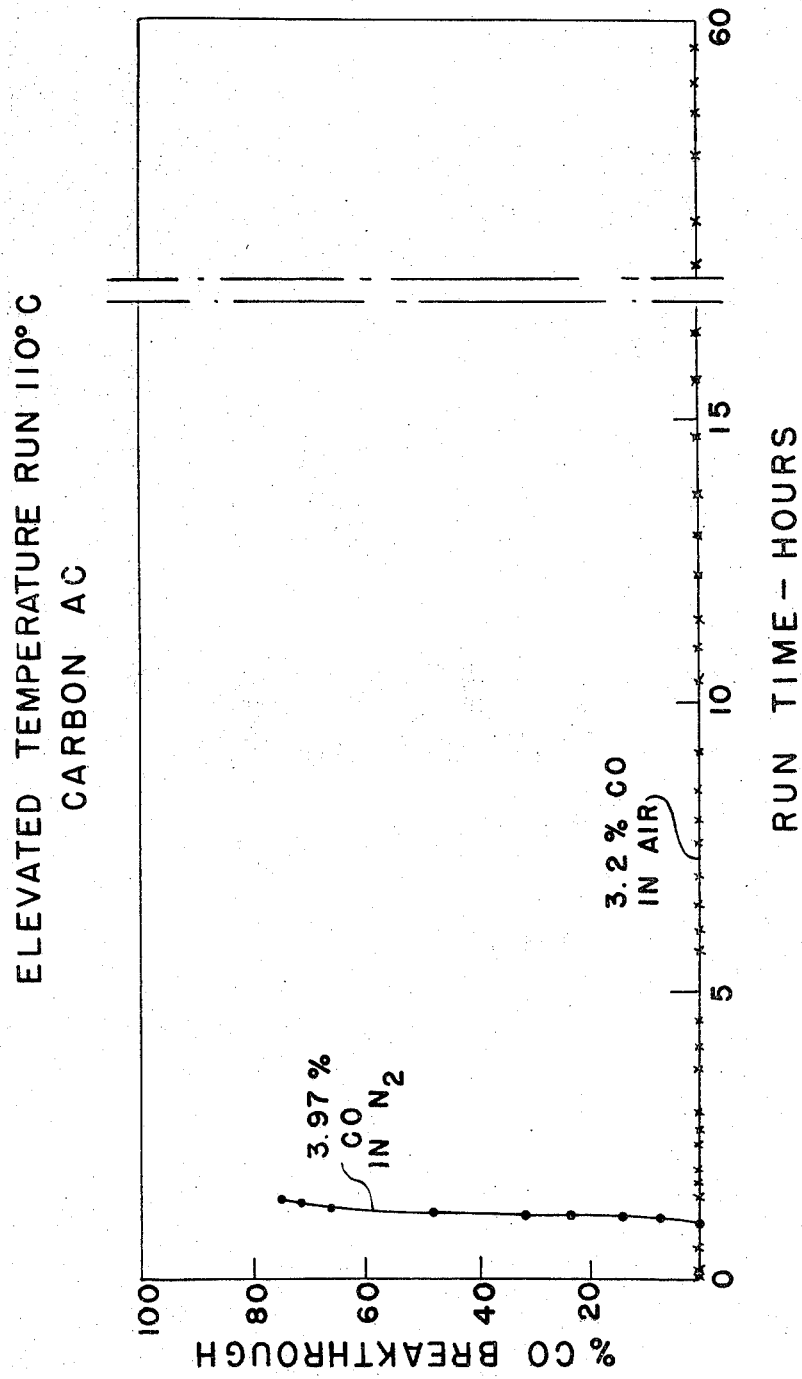

3,545,915
METHOD OF REMOVING CARBON MONOXIDE FROM GASES
John R. Lutchko, Pittsburgh, and George R. Stoneburner, Coraopolis, Pa., assignor, by mesne assignments, to Calgon Corporation, a corporation of Delaware
Filed July 19, 1967, Ser. No. 654,618
Int. Cl. B01d 53/00
U.S. Cl. 23—2
9 Claims

ABSTRACT OF THE DISCLOSURE

Carbon monoxide is removed from a gas mixture continuously at elevated temperature by passing the gas mixture over a mixture of copper and hexavalent chrome compound impregnated on a support of high surface area, preferably activated carbon, by introducing sufficient oxygen to stoichiometrically convert the CO to $CO_2$. The oxygen is preferably introduced as air.

Copper-chrome-silver impregnated supports also can be used.

---

The present invention relates to the removal of carbon monoxide from gases.

In Kranc and Lutchko application Ser. No. 653,517, filed July 14, 1967, and now abandoned, entitled "Removal of Carbon Monoxide and Nitric Oxide With Copper Chromium Impregnated on a Support," it is proposed to remove carbon monoxide from other gases such as nitrogen, ammonia synthesis gas, flue gases, automobile exhausts, home heater exhaust gases, hydrogen, and the like by passing the carbon monoxide containing gas through a copper-chrome compound impregnated on a support of high surface area. Silver compounds can also be present. The chrome is in the hexavalent state. According to the Kranc et al. application it is necessary to regenerate the exhausted impregnated support at frequent intervals.

It is an object of the present invention to reduce or eliminate the need for frequent regeneration of copper-chrome compounds employed for removing carbon monoxide from gases.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by introducing an oxygen containing gas, preferably air, into the CO containing gas either prior to or during passing the CO containing gas through the impregnated support. The oxygen containing gas is introduced into the CO containing gas in amount at least sufficient to convert substantially all of the CO to $CO_2$. The oxygen containing gas should be heated to a temperature sufficient to regenerate the impregnated support. The temperature should be at least 50° C. but preferably is 60° C. or higher, e.g. 100° C. or higher up to 200° C. for example.

The present invention is suitable for continuously removing carbon monoxide from nitrogen, ammonia synthesis gas, flue gases, automobile exhausts, home heater exhaust gases, hydrogen, air or other oxygen containing gases.

As indicated in the Kranc et al. application, there can be employed copper-chrome or copper-chrome-silver compound impregnated supports. Any convenient copper, chrome or silver compound can be employed, e.g. cupric oxide, cupric carbonate, cupric hydroxide, etc. as well as any convenient source of hexavalent chrome, e.g. chrome trioxide. The silver is conventionally employed as silver nitrate. If all of the chrome is not in the hexavalent state it is gradually made hexavalent during regeneration of the impregnated material.

The ratio of copper to chrome is not critical. Thus there can be 0.1 to 10 moles of copper compound per mole of chrome compound although usually there is employed 0.5 to 1.5 moles of copper compound per mole of chrome compound.

When the silver compound is employed it is used in amount less than that of the chrome compound, e.g. from 0.01 to 0.5 mole per mole of chrome compound.

The copper-chrome or copper-chrome-silver compound is impregnated on the support to give 0.05 to 2 grams of impregnant per gram of support.

The preferred support is activated carbon either in granular, powder, fiber or cloth form because it has the highest surface area. However, other supports of high surface area can be used such as alundum, fire brick, diatomaceous material, activated alumina or the like.

The support, preferably activated carbon, desirably has a surface area per gram of at least 600 sq. meters/gm. and can have a surface area up to 1300 sq./meter gm. Activated carbon supports employed usually have a surface area of 950 to 1200 sq. meter/gm. The support is usually granular in form of 4 to 325 mesh (U.S. sieve series).

As the activated carbon support is impregnated there can be employed conventional activated carbons such as Pittsburgh type carbon SGL or Pittsburgh type BPL, etc.

The carbon monoxide is not adsorbed on the support but instead is converted to carbon dioxide. If the carbon dioxide formed is not wanted in the final gas it can be removed therefrom in known manner. Thus it can be removed by passing the carbon dioxide containing gas through activated carbon impregnated with 5 to 50% of monoethanolamine, e.g. 27.5% (based on the total weight of monoethanolamine and carbon), as more fully disclosed in Manes application 595,346, filed Nov. 18, 1966. The entire disclosure of the Manes application is hereby incorporated by reference. It should be noted that monoethanolamine impregnated activated carbon is ineffective for removing carbon monoxide from gases.

As previously indicated, the preferred support for the copper-chrome (or copper-chrome-silver) is granular activated carbon.

In the following examples as illustrated by the drawings there was employed copper-chrome carbon. Copper-chrome-silver carbon can also be employed as indicated supra.

The copper-chrome-silver carbon was formed by impregnating granular Pittsburgh type BPL carbon (12 x 30 mesh) with a mixture of 114 grams of $CnCO_3Cu(OH)_2$, 34 grams of $CrCO_3$ and 3 grams of $AgNO_3$ in 284 cc. of aqueous ammonia (25 volume percent) and 390 cc. of water. The impregnated carbon was dried to give the copper-chrome-silver carbon containing 0.24 gram of impregnant for each gram of activated carbon (unless otherwise indicated). Unless otherwise indicated all parts and percentages are by weight.

The invention will be understood best in connection with the drawings wherein the single figure is a graph showing the long time activity of the copper-chrome carbon in removing CO with the aid of an oxygen containing gas.

Referring more specifically to the drawings elevated temperature runs are shown using copper-chrome carbon beds 20 mm. in diameter and 100 mm. high. The beds contained 0.24 gram of copper-chrome compound per gram of carbon.

In the graph the ordinate is set forth as the time of the run in hours while the abscissa is percent CO breakthrough.

Using a flow rate of 100 ml./min. with a test gas of 3.9% CO in nitrogen and a bed temperature of 102° C. there was no CO breakthrough for 1 hour. At this point, however, there was sharp CO breakthrough as illustrated by the fact that the CO breakthrough was 31% at 1.1 hours and 75% CO breakthrough after 1.5 hours.

In contrast using a flow rate of 100 ml./min. with a test gas consisting of 3.2% CO in air and a bed temperature of 110° C. there was no CO breakthrough in a run which lasted 59.5 hours.

There was sufficient oxygen in the air to oxidize the CO to $CO_2$. Hence the copper chrome was not reduced and there was no need to regenerate it (or else the oxygen in the air acted to reoxidize the copper chrome as fast as it was reduced).

What is claimed is:

1. In a process of continuously removing CO from a mixture with another gas by passing the gas through an activated carbon support having a surface area of from 600 sq. meters 1 gm. to 1300 sq. meters 1 gm., said support being impregnated with copper chrome, the chrome being in the hexavalent state, the improvement comprising supplying sufficient oxygen to the gas mixture to convert all of the CO to $CO_2$ and at a temperature of 50° C. to 200° C. to continuously maintain the efficiency of the impregnated support for CO conversion to $CO_2$.

2. A process according to claim 1 wherein the support has a surface area of 950 to 1200 sq. meters/gm.

3. A process according to claim 2 wherein the CO is converted at a temperature of at least 50° C.

4. A process according to claim 2 wherein the CO is converted at a temperature of at least 60° C.

5. A process according to claim 2 wherein the CO is converted at a temperature of at least 100° C.

6. A process according to claim 1 wherein the oxygen is supplied as air.

7. A process according to claim 1 wherein the gas mixture is air containing CO.

8. A process according to claim 7 wherein the CO is converted at a temperature of 50° C. to 110° C.

9. A process according to claim 8 wherein the CO is converted at a temperature of at least 100° C.

References Cited

UNITED STATES PATENTS

| | | | |
|---|---|---|---|
| 1,842,010 | 1/1932 | Braus | 23—2 |
| 2,092,059 | 9/1937 | Frazer | 23—2 |
| 2,937,490 | 5/1960 | Calvert | 23—2X |
| 2,942,933 | 6/1960 | Batchelder et al. | 23—2 |

FOREIGN PATENTS

| | | | |
|---|---|---|---|
| 127,609 | 6/1919 | Great Britain | 23—2 |
| 952,936 | 3/1964 | Great Britain | 23—2 |

EARL C. THOMAS, Primary Examiner

U.S. Cl. X.R.

23—4

UNITED STATES PATENT OFFICE
CERTIFICATE OF CORRECTION

Patent No. 3,545,915      Dated December 8, 1970

Inventor(s) John R. Lutchko et al.

It is certified that error appears in the above-identified patent and that said Letters Patent are hereby corrected as shown below:

Column 2, line 58, "$CnCO_3Cu(OH)_2$" should read -- $CuCO_3Cu(OH)_2$ --; line 59, "$CrCO_3$" should read -- $CrO_3$ --.

Signed and sealed this 1st day of June 1971.

(SEAL)
Attest:

EDWARD M. FLETCHER, JR.
Attesting Officer

WILLIAM E. SCHUYLER, JR
Commissioner of Patents